(12) United States Patent
Yanagisawa et al.

(10) Patent No.: US 10,374,688 B2
(45) Date of Patent: Aug. 6, 2019

(54) WIRELESS COMMUNICATION SYSTEM AND WIRELESS COMMUNICATION METHOD

(71) Applicant: HITACHI KOKUSAI ELECTRIC INC., Tokyo (JP)

(72) Inventors: Kei Yanagisawa, Tokyo (JP); Masayuki Takekawa, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 34 days.

(21) Appl. No.: 15/551,329

(22) PCT Filed: Feb. 20, 2015

(86) PCT No.: PCT/JP2015/054744
§ 371 (c)(1),
(2) Date: Aug. 16, 2017

(87) PCT Pub. No.: WO2016/132525
PCT Pub. Date: Aug. 25, 2016

(65) Prior Publication Data
US 2018/0048379 A1    Feb. 15, 2018

(51) Int. Cl.
*H04L 5/00*    (2006.01)
*H04B 7/155*    (2006.01)
*H04W 72/08*    (2009.01)

(52) U.S. Cl.
CPC ...... *H04B 7/15542* (2013.01); *H04W 72/085* (2013.01); *H04B 7/15557* (2013.01); *H04L 5/0007* (2013.01)

(58) Field of Classification Search
CPC ............. H04B 10/29; H04B 10/2937; H04B 2210/256; H04B 3/36; H04B 3/58;
(Continued)

(56) References Cited

U.S. PATENT DOCUMENTS 8,170,567 B2    5/2012    Cai et al.
8,761,075 B2 *  6/2014    Kim ................. H04B 7/0413
                                              370/315
(Continued)

FOREIGN PATENT DOCUMENTS

JP    2011-024143 A    2/2011
JP    5154582 B2    2/2013
(Continued)

OTHER PUBLICATIONS

International Search Report dated Mar. 24, 2015.

*Primary Examiner* — Sharad Rampuria
(74) *Attorney, Agent, or Firm* — Bacon & Thomas, PLLC

(57) ABSTRACT

Provided is a technique for efficiently using a channel bandwidth in a wireless communication system provided with a function for dividing a frequency channel into a plurality of segments and performing relay using the segments that differ from relay section to relay section. In a second scheme, an upstream direction of a first relay section is a DL section, and two segments are used. An upstream direction of a second relay section is a UL section, and two segments are used. That is, 2/3 of an area is used in a frequency-axis direction, and 1/2 of the area is used in a time-axis direction similarly to a first scheme. A data area ratio for the second scheme becomes 1/3. A data area ratio for the first scheme is 1/6. Thus, a throughput for the second scheme is twice a throughput for the first scheme.

9 Claims, 7 Drawing Sheets

(58) Field of Classification Search
CPC . H04B 7/14; H04B 7/145; H04B 7/15; H04B 7/155; H04J 1/10; H04L 12/60; H04L 13/12; H04L 2001/0097; H04L 25/20; H04L 25/24; H04L 25/44; H04L 29/12566; H04L 61/2589; H04Q 2213/13191; H04Q 2213/191; H04Q 2213/218; H04Q 3/0008; H04Q 3/0012; H04W 84/047; H04W 88/04
See application file for complete search history.

(56) References Cited

U.S. PATENT DOCUMENTS

| | | | |
|---|---|---|---|
| 8,885,742 B2* | 11/2014 | Seo | H04L 27/2607 370/211 |
| 8,948,124 B2* | 2/2015 | Naden | H04B 7/15542 370/330 |
| 2008/0220790 A1* | 9/2008 | Cai | H04W 40/12 455/450 |

FOREIGN PATENT DOCUMENTS

| | | |
|---|---|---|
| JP | 2013-074529 A | 4/2013 |
| JP | 2013-098963 A | 5/2013 |
| JP | 2014-060696 A | 4/2014 |

* cited by examiner

WIRELESS COMMUNICATION SYSTEM AND WIRELESS COMMUNICATION METHOD

FIELD OF THE INVENTION

The present invention relates to a wireless communication system and a wireless communication method, and more particularly, to a wireless communication system and a wireless communication method for dividing a frequency channel into a plurality of segments and performing relay using different segments in respective relay sections.

BACKGROUND OF THE INVENTION

In a wireless relay system using an orthogonal frequency division multiplexing (OFDM) method, there is proposed a technique in which, assuming that relay is performed in up to three stages in one frequency channel, one frequency channel is divided into three segments, and different segments are used in respective relay sections (See, e.g., Patent Document 1). In the technique disclosed in Patent Document 1, one frequency channel (channel bandwidth) is divided into a plurality of segments, and relay is performed in communication between base stations through a plurality of relay stations. This technique results in effective use of frequency.

FIG. 6 shows an example of a configuration of a wireless communication system 201 using the three-stage relay scheme. FIG. 7 shows an example of a frame format used for the three-stage relay scheme. In this example, one frequency channel is divided into three segments seg0, seg1 and seg2 in a frequency-axis direction. In one frequency channel, a DL (downlink) section is first arranged in a time-axis direction, and a UL (uplink) section is arranged with a predetermined guard gap between the DL section and the UL section.

In the DL section, after a preamble region of the entire frequency channel, a frame control header (FCH) and a DL/UL MAP region are provided in the segment seg0. Subsequently, a burst DL data region is provided. Further, in the UL section, a burst UL data region is provided subsequent to a control region. In the DL/UL MAP region, allocation information of the DL direction and the UL direction is included. The segments seg1 and seg2 have the same configuration as that of the segment seg0.

In the wireless communication system 201, a base station 210 includes one mobile station (MS) 211, which is a radio unit having a function of mobile station. A first relay station 220 includes two base stations 221 and 222, each of which is a radio unit having a function of base station). A second relay station 230 includes two MSs 231 and 232, and a terminal station 240 includes one BS 241. The MS is the radio unit having a function of the mobile station and performs wireless communications (transmission/reception) with the BS. The BS is a radio unit having a function of the base station and performs wireless communications (transmission/reception) with the MS.

The segment seg0 is used in the first relay section 261 as formatted in a frame format 251. The segment seg1 is used in the second relay section 262 as formatted in a frame format 252. Further, the segment seg2 is used in the third relay section 263 as formatted in a frame format 253. Thus, it is possible to perform the relay on the same channel.

Here, a system in which a throughput either in an upstream direction or in a downstream direction is emphasized so that the upstream throughput and the downstream throughput are asymmetric is required depending on a higher-hierarchy application. However, in a system in which the relay is not performed, a time period ratio of the DL section to the UL section (Hereinafter also referred to as "DL:UL") is simply changed in response.

Patent Document 1: Japanese Patent Application Publication No. 2013-098963

However, in the above relay system, the DL section and the UL section are provided in reverse directions to the upstream direction and the downstream direction in each relay section. Further, in order to avoid an interference, the same ratio of the DL section to the UL section (DL:UL) needs to be used in each relay section. Therefore, there may be a problem that it is difficult to have a configuration in which emphasis is placed on the upstream throughput or the downstream throughput.

Further, since the relay system is configured to perform three-stage relay at maximum, two segments are used and one segment is wasted when the relay system performs two-stage relay, which is problematic.

In the technique disclosed in Patent Document 1, it is possible to reduce degradation of reception quality due to loop interference of transmission wave. However, the technique disclosed in Patent Document 1 does not consider the aforementioned problem, so that another technique is required to solve the aforementioned problem.

The present invention has been made in view of such conventional problem, and it is an object of the present invention to solve the above problem.

SUMMARY OF THE INVENTION

In accordance with an aspect of the present invention, there is provided a wireless communication system configured to divide a frequency channel into three segments and perform relay by using different segments in respective relay sections, the wireless communication system including: a relay station which performs the relay. Further, the relay station includes a segment control unit, and when a throughput in either an upstream direction or a downstream direction is emphasized, the segment control unit is configured to control such that two segments are used in the emphasized direction among the three segments used for an uplink section and a downlink section in each of the relay sections.

Further, the segment control unit may determine whether to use two segments or one segment in the emphasized direction by referring to communication quality.

Further, the segment control unit may increase output intensity when one segment is used in the emphasized direction.

Further, the segment control unit may makes the downlink section and the uplink section asymmetric.

Further, a communication method used for the relay may be an orthogonal frequency-division multiplexing method.

In accordance with another aspect of the present invention, there is provided a wireless communication method for dividing a frequency channel into three segments and performing relay by using different segments in respective relay sections, the wireless communication method including: utilizing, when a throughput in either an upstream direction or a downstream direction is emphasized, two segments in the emphasized direction among the three segments used for an uplink section and a downlink section in each of the relay sections.

Effect of the Invention

In accordance with the present invention, it is possible to provide a technique for efficiently using a channel bandwidth in the wireless communication system provided with a function for dividing a frequency channel into a plurality of segments and performing relay using the segments that differ from relay section to relay section.

DETAILED DESCRIPTION OF THE EMBODIMENTS

Hereinafter, an embodiment of the present invention (hereinafter, simply referred to as "embodiment") will be described in detail with reference to the accompanying drawings.

<First Embodiment>

Figure 1:
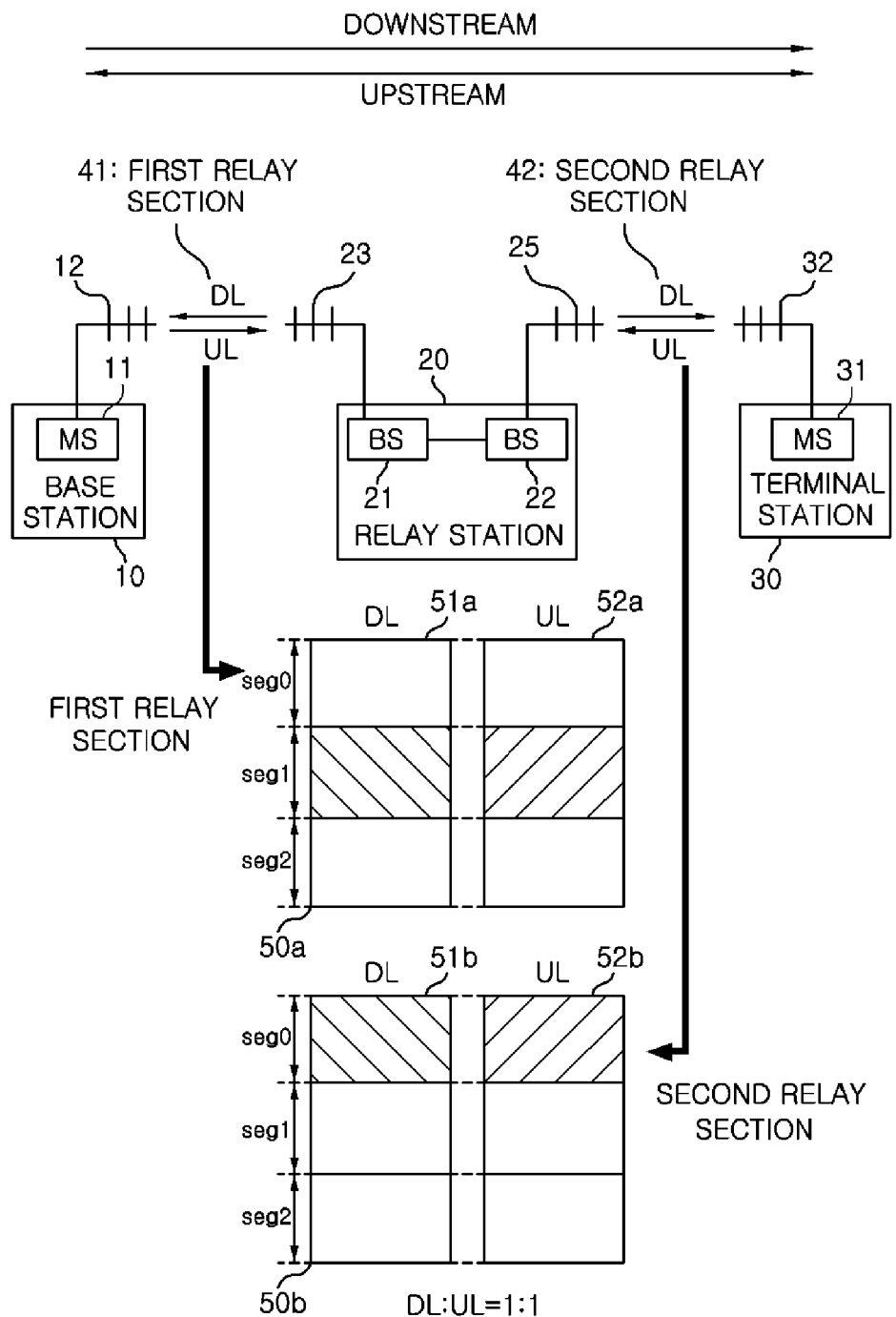
FIG. 1 shows a diagram showing a wireless communication system according to a first embodiment and frame formats used therein.
Figure 2:
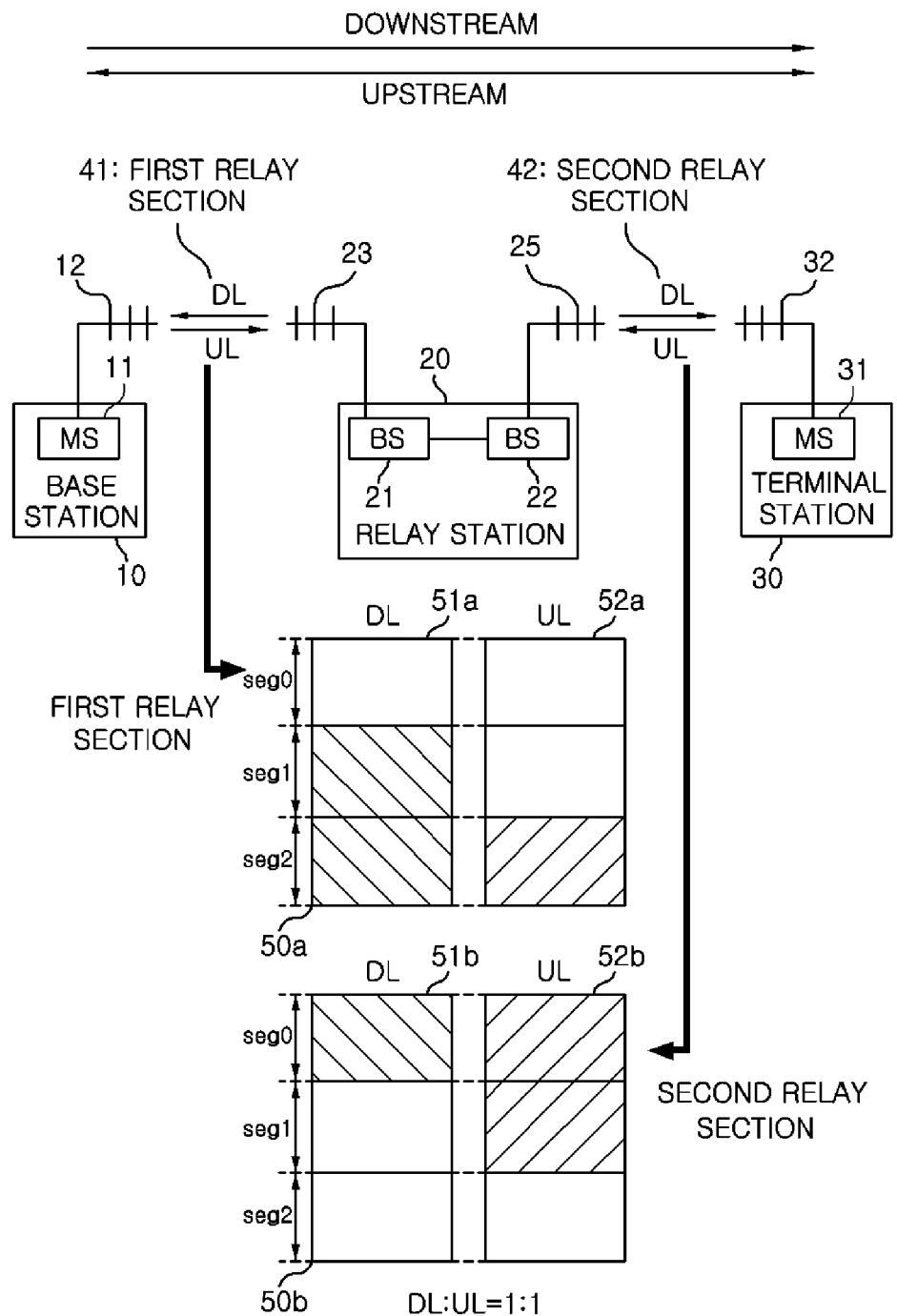
FIG. 2 shows another diagram showing the wireless communication system according to the first embodiment and frame formats used therein.

FIGS. 1 and 2 show a configuration of a wireless communication system 1 according to the embodiment and an active segment used in a frequency channel. In FIGS. 1 and 2, a left-to-right direction is referred to as "downstream" and a right-to-left direction is referred to as "upstream".

FIG. 1 shows an example of dividing a frequency channel into three segments and using one segment in each relay section. FIG. 2 shows an example of dividing a frequency channel into three segments and using two segments in upstream in each relay section. That is, when there is no particular emphasizing direction, operation is performed by a segment use mode shown in FIG. 1. Further, when the emphasis is particularly placed on the upstream, that is, when the data amount in the upstream is high, operation is performed by a segment use mode shown in FIG. 2. Hereinafter, for the sake of convenience, the operation using the segment use mode shown in FIG. 1 is referred to as a first scheme, and the operation using the segment use mode shown in FIG. 2 is referred to as a second scheme.

The wireless communication system 1 includes a base station 10, a relay station 20 and a terminal station 30. In the illustrated example, the base station 10 includes a base station MS 11. The relay station 20 includes a first relay station BS 21 and a second relay station BS 22. The terminal station 30 includes a terminal station MS 31. In FIGS. 1 to 7, the base station MS and the terminal station MS are simply denoted by "MS", and the first relay station BS and the second relay station BS are simply denoted by "BS".

The base station MS 11, the first relay station BS 21, the second relay station BS 22, and the terminal station MS 31 are connected to antennas 12, 23, 25 and 32, respectively. Further, a downlink DL and an uplink UL are decided on the basis of the relay station 20. That is to say, the "DL" refers to transmission from the relay station 20 (the first relay station BS 21 and the second relay station BS 22) to the base station 10 and the terminal station 30. The "UL" refers to transmission from the base station 10 and the terminal station 30 to the relay station 20 (the first relay station BS 21 and the second relay station BS 22).

Further, for the sake of convenience, a relay section between the base station 10 and the relay station 20 is referred to as a first relay section 41, and a relay section between the relay station 20 and the terminal station 30 is referred to as a second relay section 42.

Figure 3:
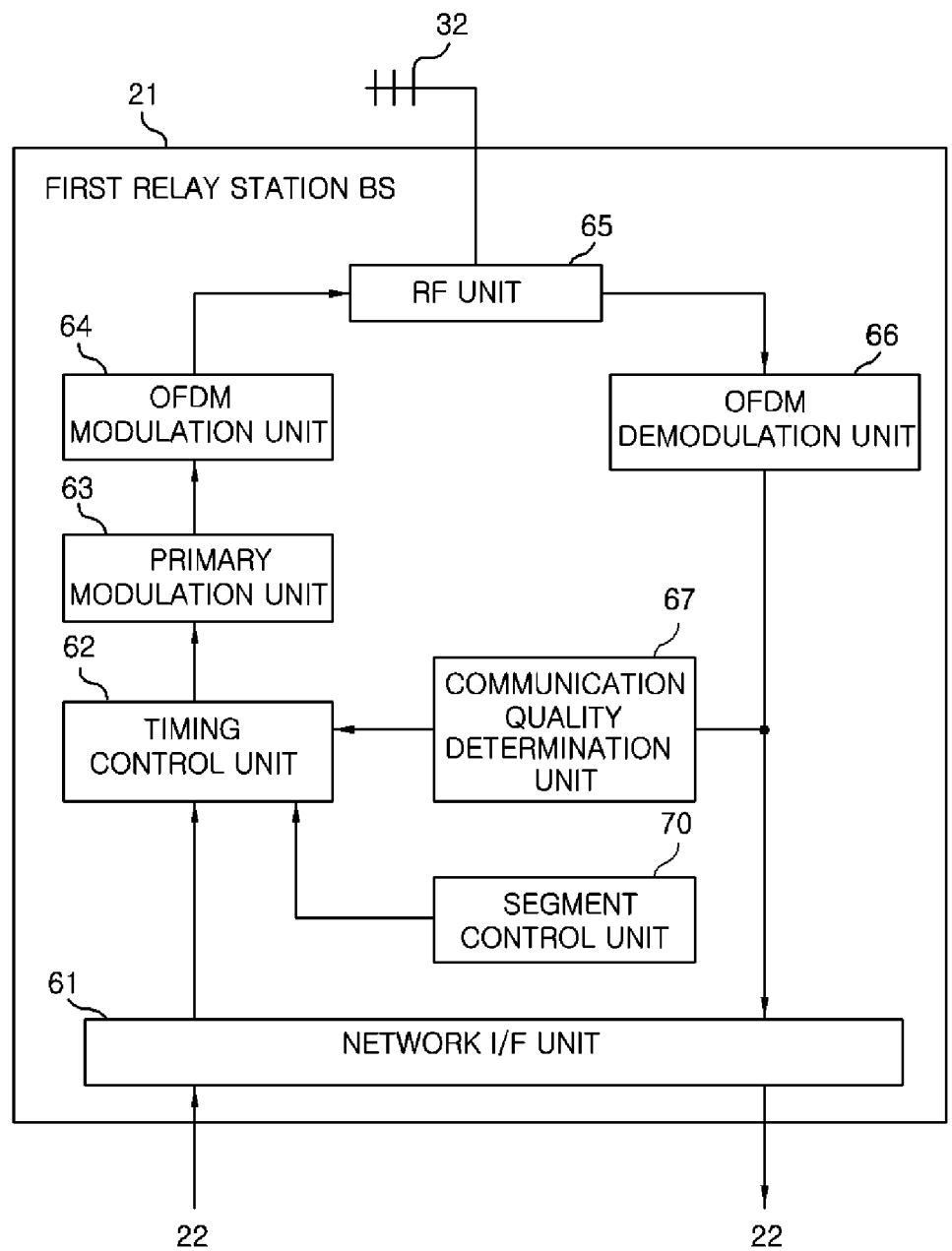
FIG. 3 shows a schematic configuration of a relay station BS according to the first embodiment.

FIG. 3 is a functional block diagram showing a schematic configuration of the first relay station BS 21 of the relay station 20. Further, the second relay station BS 22 has the same configuration as that of the first relay station BS 21. Further, the base station MS 11 of the base station 10 and the terminal station MS 31 of the terminal station 30 may be implemented by a general configuration of MS. Further, for BS and MS, in recent years, there is generally provided a device which has both functions of BS and MS and functions as BS or MS by using a switch. Depending on whether the switch is set to connect with BS or MS at the start-up of the device, the device is operated as either BS or MS. Accordingly, in this embodiment, the same type of device may be employed to function as BS or MS by a switch.

As shown in FIG. 1, in the first scheme, one frequency channel is divided into three segments seg0 to seg2 as shown in each of a frame format 50a of the first relay section 41 and a frame format 50b of the second relay section 42. Further, as shown in FIG. 2, the same division can be applied to the second scheme.

In the first scheme, among the three segments, the segments seg0 and seg1 are used and the segment seg2 is not used. The detailed data structure of each segment is the same as the structure shown in FIG. 7. Therefore, the following description is mainly focused on the number of segments to be used.

For wireless communications (transmission/reception) in the first relay section 41, the segment seg1 is used for both a DL section 51a and a UL section 52a. For wireless communication in the second relay section 42, the segment seg0 is used for both a DL section 51b and a UL section 52b.

In the second scheme, as shown in FIG. 2, the segments seg1 and seg2 are used for the wireless communications in the DL section 51a of the first relay section 41. The segment seg0 is used for wireless communications in the DL section 51b of the second relay section 42.

Referring back to FIG. 1, the segment seg1 is used for wireless communications in both the DL section 51a and the UL section 52a of the first relay section 41. In other words, the segment seg1 among the divided three segments is used for wireless communications between the base station MS 11 and the first relay station BS 21. Further, the segment seg0 is used for wireless communications in both the DL section 51b and the UL section 52b of the second relay section 42. In other words, the segment seg0 among the divided three segments is used for wireless communications between the second relay station BS 22 and the terminal station MS 31. The segment seg2 among the divided three segments is not used.

The relay station 20 performs wireless communications by operating the first and the second relay station BS 21 and 22 through the antennas 23 and 25, respectively.

FIG. 3 is a functional block diagram showing a schematic configuration of the first and the second relay station BS 21 and 22. Here, the relay station BS 21 making communications with the base station MS 11 of the base station 10 will be mainly described.

The relay station BS 21 includes a network I/F unit 61, a timing control unit 62, a primary modulation unit 63, an OFDM modulation unit 64, an RF unit 65, an OFDM demodulation unit 66, a communication quality determination unit 67, and a segment control unit 70.

The network I/F unit 61 is, e.g., a LAN-I/F, and is connected to the relay station BS 22 by a LAN cable or the like.

The timing control unit 62 is configured to control data arrangement and timing of the frame. Data to be transmitted (transmission data) is inputted to the timing control unit 62 through the network I/F unit 61. The timing control unit 62 maps the inputted transmission data onto subcarriers (segments), and outputs the mapped data to the primary modulation unit 63. At the time of mapping, the timing control unit 62 performs the mapping according to the number of divided segments, which is determined by the segment control unit 70 to be described later. Therefore, the timings of the DL and the UL and the subcarriers to be used can be appropriately controlled by the timing control unit 62.

The primary modulation unit 63 is configured to execute an adaptive modulation function to modulate the data inputted from the timing control unit 62 and generate a primary modulation signal for each subcarrier allocated by the timing control unit 62. The generated primary modulation signal is outputted to the OFDM modulation unit 64.

The OFDM modulation unit 64 is configured to perform orthogonal transformation of the primary modulation signal for each subcarrier inputted from the primary modulation unit 63 such that the primary modulation signal is orthogonally transformed from a frequency-domain signal to a time-domain signal by inverse FFT. Then, the OFDM modulation unit 64 outputs the baseband signal thus generated to the RF unit 65.

The RF unit 65 is configured to convert the baseband signal inputted from the OFDM modulation unit 64 into a radio frequency signal and outputs it to the antenna 23. This signal is outputted from the antenna 23 to the space, more specifically, toward the base station 10 (i.e., the base station MS 11) in the DL section. Further, the primary modulation unit 63 is configured to convert a radio frequency signal received from the antenna 23 into a baseband signal and output the baseband signal to an OFDM demodulation unit 66.

The OFDM demodulation unit 66 is configured to convert the baseband signal into reception modulation signal for each subcarrier by FFT (Fast Fourier transform) and demodulate the reception modulation signal to output the reception data to the relay station BS 22 through the network I/F unit 61.

Further, the communication quality determination unit 67 is configured to measure a quality of the reception modulation signal and transmit C/N information in a direction (upstream direction) from the terminal station 30 to the relay station 20 to the timing control unit 62 (or the primary modulation unit 63). The transmitted C/N information and the transmission data in a direction from the MS (e.g., the base station MS 11) to the BS (e.g., the first relay station BS 21) are primarily modulated, and the primary modulation signal for each subcarrier is outputted to the OFDM modulation unit 64.

The segment control unit 70 is configured to control how to divide carriers into subcarriers (segments) (division manner) and how to use the subcarriers (usage mode) in data transmission and reception. More specifically, the segment control unit 70 determines whether to divide the carrier into three segments or two segments. Whether to divide the carrier into three segments or two segments is determined by an operation manager of the system by manipulating a switch at the start-up of the system. The segment control unit 70 controls the division manner and the usage mode of the segments by changing a setting value of a configuration file (config file). More specifically, the division manner and the usage mode of the segments are controlled based on an index described in the preamble (see FIG. 7) in the frame format. The base station MS 11 or the terminal station MS 31, which receives the data, can determine the division manner and the usage mode operated in the wireless communication system 1 by referring to the index described in the preamble.

An automatic operation selection between the first scheme and the second scheme will be described later. In a second embodiment to be described later, the segment control unit 70 is configured to control a ratio of the DL section to the UL section. Specifically, the segment control unit 70 determines whether to set the ratio of the DL section to the UL section to be 1:1 or 2:1 (or 1:2).

Subsequently, referring back to FIGS. 1 and 2, throughputs of the first scheme and the second scheme are compared with each other. In the second scheme, there will be described an example of two-stage relay when emphasizing a throughput in the upstream direction. The time period ratio of the DL section to the UL section is set to be 1:1 for both the first scheme and the second scheme.

In the first scheme, 1/2 of a data area in the time-axis direction and one segment out of three segments are used. Therefore, a data area ratio DA1 in one frame format is as follows:

$$DA1=(1/2)\times(1/3)=1/6.$$

In the second scheme, the upstream direction in the first relay section 41 is the DL section, and two segments seg1 and seg2 are used. The upstream direction in the second relay section 42 is the UL section, and two segments seg0 and seg1 are used. That is, 2/3 of a data area in the frequency-axis direction is used, and 1/2 of a data area in the time-axis direction is used as in the first scheme.

Therefore, a data area ratio DA2 in one frame format is as follows:

$$DA2=(1/2)\times(2/3)=1/3.$$

From the above result, a ratio of DA2 to DA1 is as follows:

$$DA2/DA1=(1/3)/(1/6)=2.$$

That is to say, the throughput of the second scheme is twice the throughput of the first scheme. In other words, when the emphasis is placed on the throughput in either the upstream direction or the downstream direction, it is possible to increase the throughput in the emphasized direction.

Figure 4:
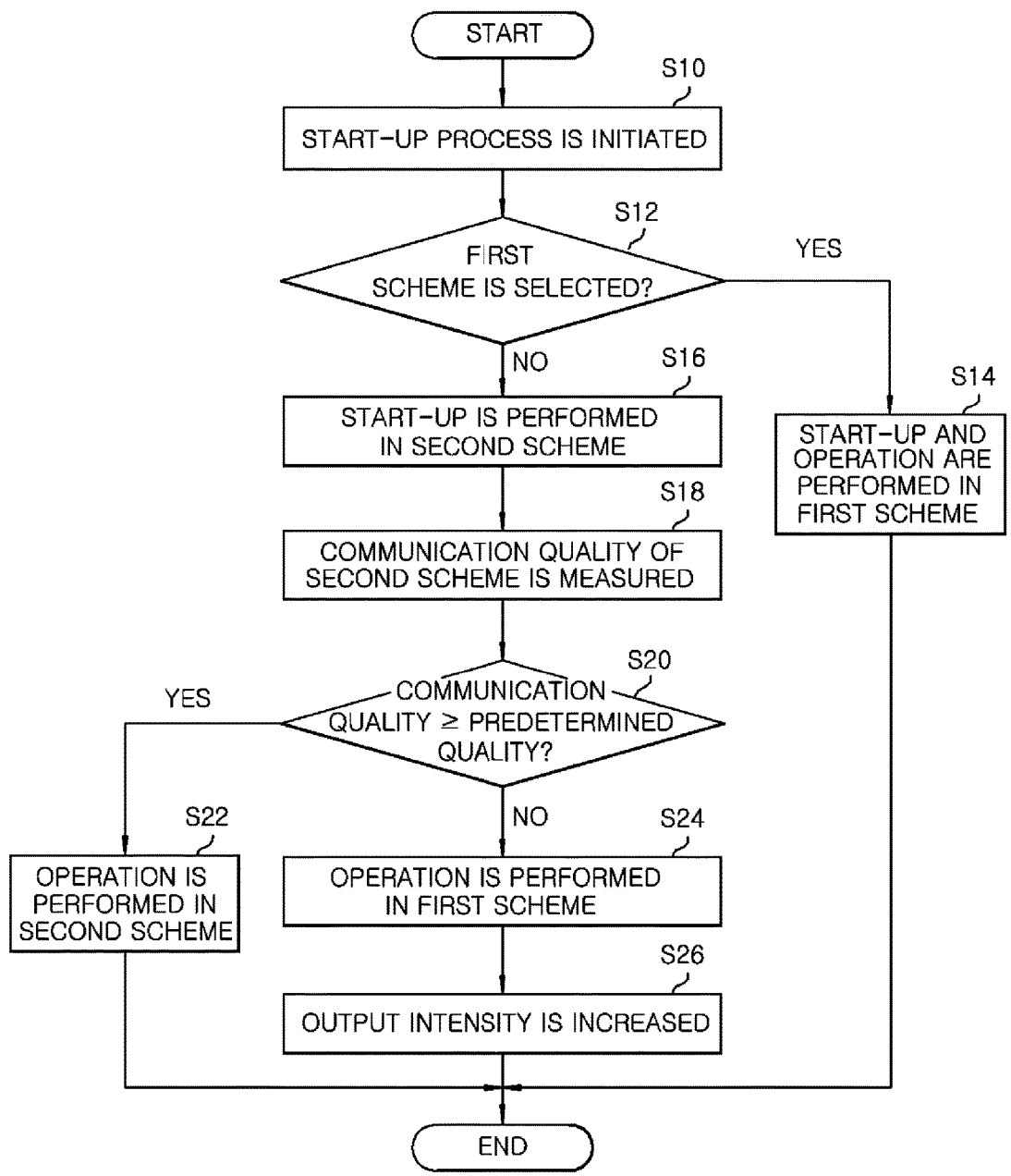
FIG. 4 is a flowchart showing operation flow at the time of starting a relay station according to the first embodiment.

Next, there will be described an example of processing the operation selection between the first scheme and the second scheme with reference to a flowchart of FIG. 4. For a general process of the operation selection, for example, the operation is selected between the first scheme and the second scheme by switching a switch provided in each of the MS and the BS at the time of a start-up process of the base station 10, the relay station 20 and the terminal station 30. Further, it may be possible to automatically select the operation between the first scheme and the second scheme with reference to the communication quality. In FIG. 4, the process of automatically selecting the operation will be described. Specifically, there will be described an example in which the first relay station BS 21 of the relay station 20 generally controls the operation selection between the first scheme and the second scheme in the wireless communication system 1.

In each of the base station 10, the relay station 20, and the terminal station 30, a start-up process is initiated by turning on each station, that is, by turning on each power switch of the base station MS 11, the first and the second relay station BS 21 and 22, and the terminal station MS 31 (step S10).

In the first relay station BS 21, the segment control unit 70 determines whether the selected operation is the first scheme or the second scheme (step S12).

When it is determined that the first scheme is selected ("YES" in step S12), the segment control unit 70 performs a start-up and an operation in the first scheme (step S14).

When it is determined that the second scheme is selected ("NO" in step S12), that is, when there is an emphasized direction, the segment control unit 70 performs a start-up in the second scheme (step S16). After the start-up, by referring to the communication quality, which is obtained from the communication quality determination unit 67 (step S18), e.g., the C/N value or the like, the segment control unit 70 determines whether the communication quality is equal to or higher than a predetermined quality, that is, whether a sufficient throughput can be obtained by the second scheme or not (step S20).

When the communication quality is equal to or higher than the predetermined quality ("YES" in step S20), the segment control unit 70 performs the segment usage control of the second scheme (step S22).

When the communication quality has not reached the predetermined quality ("NO" in step S20), the segment control unit 70 performs the segment usage control of the first scheme (step S24). Here, in the case of the first scheme, one segment is not used. In other words, the device such as the relay station BS 21 or the like has a power capability, i.e., the rated power, which can be obtained when using all the three segments. Therefore, the segment control unit 70 increases output intensity, i.e., amplitude of an output radio wave (step S26). As a result, it is possible to prevent the throughput from being significantly lowered even when the communication quality is insufficient and communication, in which a predetermined direction is emphasized, cannot be performed. Further, the segment control unit 70 may perform a control of obtaining optimum output intensity based on the communication quality and the throughput. In this case, the segment control unit 70 controls the amplitude to be suppressed according to a state of power supply (usable time and the like) when emphasizing a power saving, or increases the amplitude when emphasizing the throughput.

<Second Embodiment>

Figure 5:
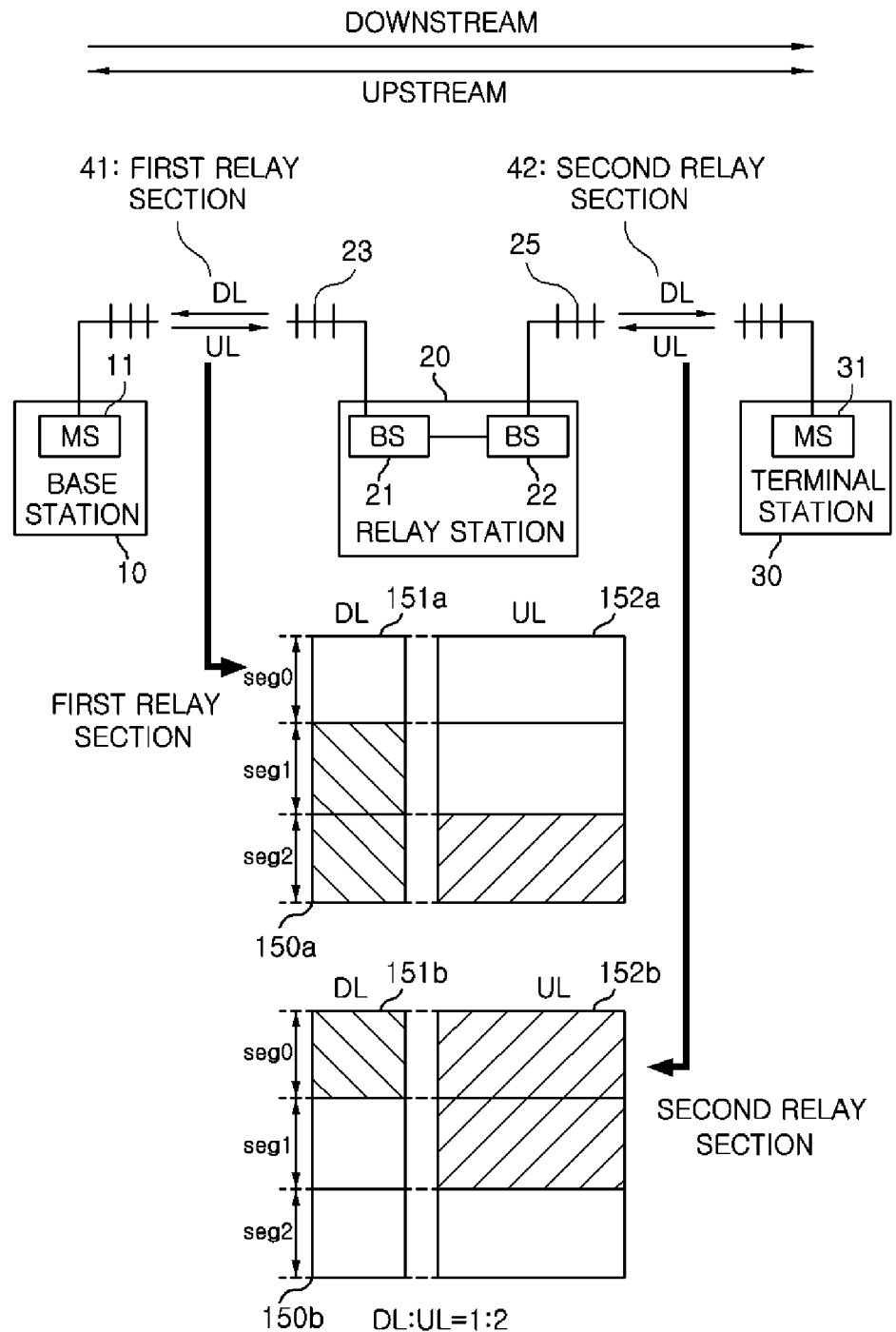
FIG. 5 is a diagram showing a wireless communication system according to a second embodiment and frame formats used therein.
Figure 6:
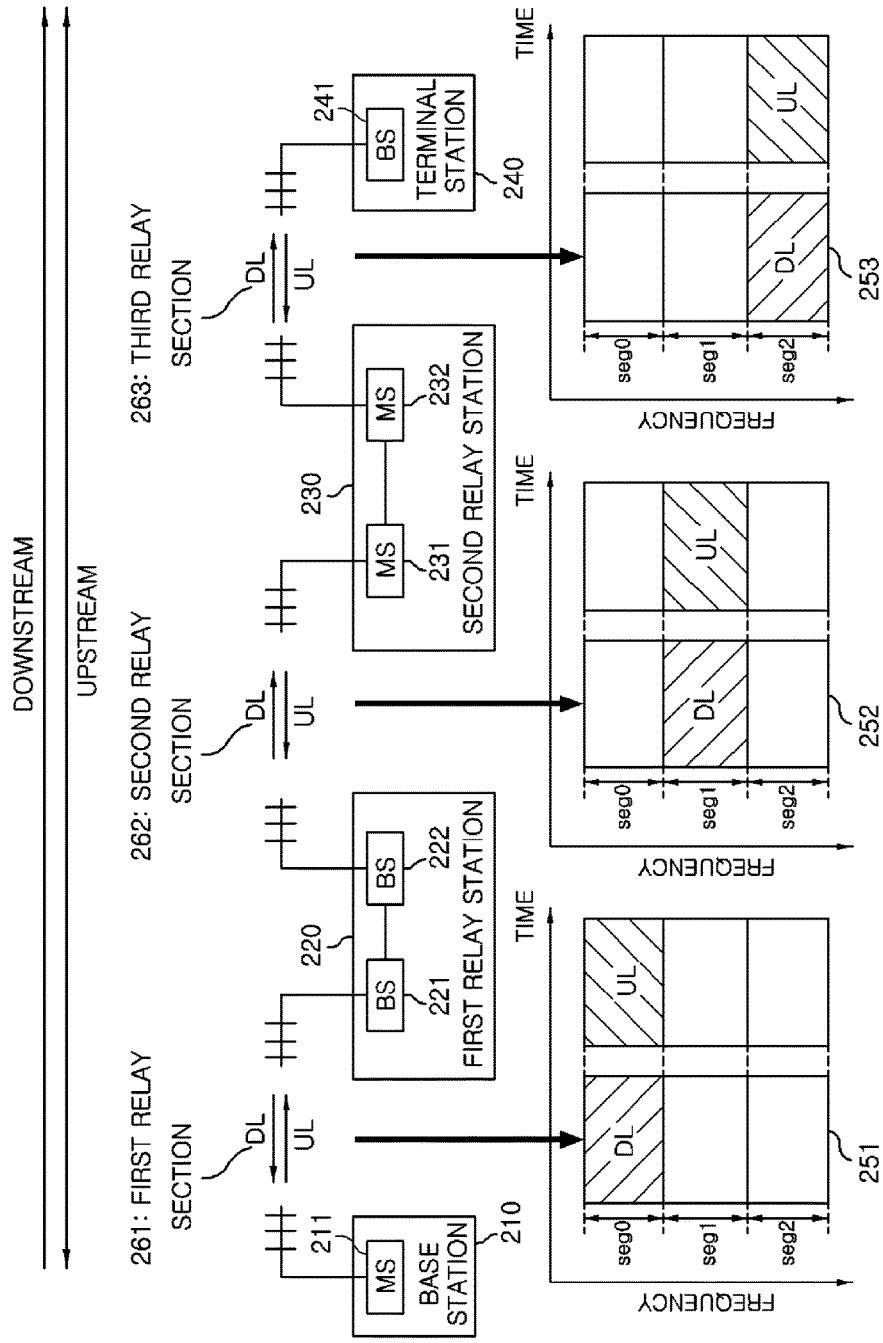
FIG. 6 is a diagram showing a wireless communication system according to the background art.
Figure 7:
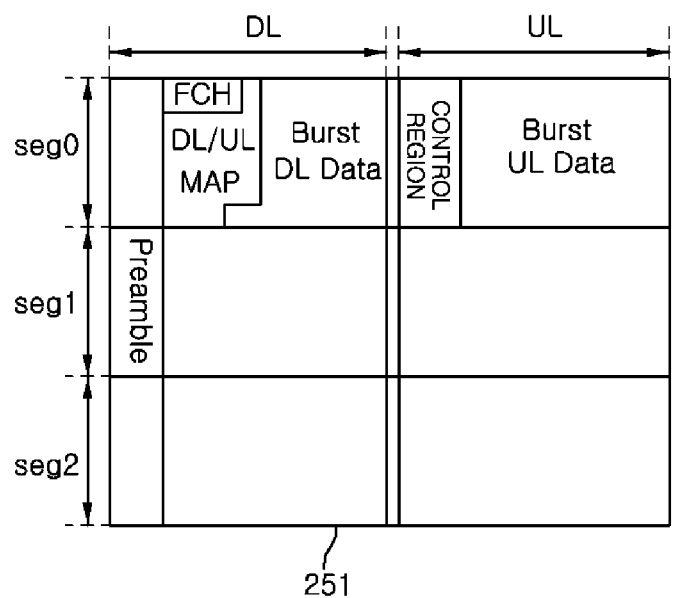
FIG. 7 is a diagram showing a frame format according to the background art.

FIG. 5 is a diagram showing a wireless communication system 1 of the second embodiment and frame formats 150*a* and 150*b* used therein. Since a configuration of the wireless communication system 1 can be realized in the same manner as in the first embodiment, the following description will be focused on the frame formats 150*a* and 150*b*.

Unlike the first embodiment, the second embodiment describes an example in which a time period ratio of the DL section to the UL section (DL:UL) is 1:2 and a throughput in the upstream direction is emphasized.

The upstream direction in the first relay section 41 is the DL section, and two segments are used in this DL section. The upstream direction in the second relay section 42 is the UL section, and two segments are used in the UL section. Therefore, the data area occupied in the upstream direction in each relay section can be obtained as follows. In the DL section of the first relay section 41, 1/3 of a data area in the time-axis direction is used and 2/3 of a data area in the frequency-axis direction is used due to the use of two segments. Therefore, a data area ratio DA21 becomes as follows:

$$DA21=(1/3)\times(2/3)=2/9$$

In the UL section of the second relay section 42, 2/3 of a data area in the time-axis direction is used and 1/3 of a data area in the frequency-axis direction is used due to the use of one segment. Therefore, a data area ratio DA22 becomes as follows:

$$DA22=(2/3)\times(1/3)=2/9$$

In the first scheme, as described in the first embodiment, the data area ratio DA1 is 1/6. Therefore, a ratio of DA21 to DA1 and a ratio of DA22 to DA1, becomes as follows:

$$DA21/DA1=DA22/DA1=(2/9)/(1/6)=4/3.$$

In view of the above, the throughput of the second scheme is about 1.33 times the throughput of the first scheme. In other words, throughput improvement of about 33% is expected compared with the first scheme.

As described above, in accordance with the aforementioned embodiments, it is possible to establish an upstream/downstream throughput asymmetric configuration in the wireless communication system which is a segmented OFDMA relay system. That is, even in case where it is necessary to set communication time period in the second relay section 42 to be longer than communication time period in the first relay section 41, it becomes possible to improve the throughput.

While the invention has been shown and described with respect to the embodiments, it will be understood by those skilled in the art that various changes and modification may be made without departing from the scope of the invention.

EXPLANATION OF REFERENCE SYMBOLS

1: wireless communication system
10: base station
11: base station MS
12, 23, 25, 32: antennas
20: relay station (relay device)
21: first relay station BS
22: second relay station BS
30: terminal station
31: terminal station MS
41: first relay section
42: second relay section
50*a*, 50*b*: frame format
51*a*, 51*b*: DL section
52*a*, 52*b*: UL section
61: network I/F unit
62: timing control unit
63: primary modulation unit
64: OFDM modulation unit
65: RF unit
66: OFDM demodulation unit
67: communication quality determination unit
70: segment control unit

What is claimed is:

1. A wireless communication system configured to divide a frequency channel into three segments and perform relay by using different segments in respective relay sections, the wireless communication system comprises:

a processor;
a memory storage; and a relay station for performing the relay; wherein the processor and the memory storage are configured to execute software instructions embodied within the relay station; and wherein the relay station includes
   a segment control unit which is configured to control a first scheme or a second scheme, wherein in the first scheme, one segment among the three segments is used in each relay section, wherein in the second scheme, two segments are used in the emphasized direction among the three segments used for an uplink section and a downlink section in each of the relay sections when a throughput in either an upstream direction or a downstream direction is emphasized; and
   a manipulating unit which is configured to select the first scheme or the second scheme,
wherein the segment control unit determines whether the selected operation by the manipulating unit is the first scheme or the second scheme,
wherein the segment control unit performs a start-up in the second scheme, and determines a communication quality when it is determined that the second scheme is selected,
wherein the segment control unit continues to perform in the second scheme when the communication quality is equal to or higher than a predetermined quality, and
wherein the segment control unit switches to the first scheme and increases output intensity when the communication quality has not reached the predetermined quality.

2. The wireless communication system of claim 1, wherein the segment control unit makes the downlink section and the uplink section asymmetric.

3. The wireless communication system of claim 1, wherein a communication method used for the relay is an orthogonal frequency-division multiplexing method.

4. A wireless communication method for dividing a frequency channel into three segments and performing relay by using different segments in respective relay sections, the method being implemented by a processor executing executable instructions on a memory storage, the wireless communication method comprises:
   selecting a first scheme or second scheme, wherein in the first scheme, one segment among the three segments is used in each relay section, and wherein in the second scheme, two segments are used in the emphasized direction among the three segments used for an uplink section and a downlink section in each of the relay sections when a throughput in either an upstream direction or a downstream direction is emphasized;
   determining whether the selected operation is the first scheme or the second scheme; when it is determined that the second scheme is selected, performing a start-up in the second scheme, and determining a communication quality;
   when the communication quality is equal to or higher than a predetermined quality, continuing to perform in the second scheme; and
   when the communication quality has not reached the predetermined quality, switching to the first scheme and increasing output intensity.

5. The wireless communication system of claim 1, wherein the segment control unit makes the downlink section and the uplink section asymmetric.

6. The wireless communication system of 1, wherein the segment control unit makes the downlink section and the uplink section asymmetric.

7. The wireless communication system of claim 1, wherein a communication method used for the relay is an orthogonal frequency-division multiplexing method.

8. The wireless communication system of claim 1, wherein a communication method used for the relay is an orthogonal frequency-division multiplexing method.

9. The wireless communication system of claim 2, wherein a communication method used for the relay is an orthogonal frequency-division multiplexing method.

\* \* \* \* \*